(12) United States Patent
Oishi

(10) Patent No.: US 7,048,860 B2
(45) Date of Patent: May 23, 2006

(54) MATERIAL FOR TREATING ACIDIC WASTE WATER

(75) Inventor: Tohru Oishi, Chiba (JP)

(73) Assignee: Nippon Steel Chemical Co., Ltd., Tokyo (JP)

( * ) Notice: Subject to any disclaimer, the term of this patent is extended or adjusted under 35 U.S.C. 154(b) by 183 days.

(21) Appl. No.: 10/472,524

(22) PCT Filed: Mar. 28, 2002

(86) PCT No.: PCT/JP02/03118

§ 371 (c)(1),
(2), (4) Date: Sep. 24, 2003

(87) PCT Pub. No.: WO02/079100

PCT Pub. Date: Oct. 10, 2002

(65) Prior Publication Data

US 2004/0140268 A1  Jul. 22, 2004

(30) Foreign Application Priority Data

Mar. 29, 2001 (JP) .............................. 2001-096571

(51) Int. Cl.
*C02F 1/64* (2006.01)
(52) U.S. Cl. ...................... 210/714; 210/716; 210/724; 210/726; 210/912; 252/175
(58) Field of Classification Search ................ 210/667, 210/688, 702, 711, 714, 724, 726, 912; 252/175
See application file for complete search history.

(56) References Cited

U.S. PATENT DOCUMENTS

| | | | | | |
|---|---|---|---|---|---|
| 2,746,920 | A | * | 5/1956 | Wunderley | ................. 210/667 |
| 4,377,483 | A | * | 3/1983 | Yamashita et al. | .......... 210/670 |
| 4,547,290 | A | * | 10/1985 | Pichat | ........................ 588/257 |
| 4,652,379 | A | * | 3/1987 | Nyberg | ....................... 210/717 |
| 6,602,421 | B1 | * | 8/2003 | Smith | .......................... 210/662 |
| 6,893,570 | B1 | * | 5/2005 | Hilton et al. | ................ 210/667 |

FOREIGN PATENT DOCUMENTS

| JP | 62-183898 A1 | 8/1987 |
|---|---|---|
| JP | 05-050085 A1 | 3/1993 |
| JP | 05-050086 A1 | 3/1993 |
| JP | 07-178394 A1 | 7/1995 |
| JP | 2000-073347 A1 | 3/2000 |

OTHER PUBLICATIONS

English Translation of International Preliminary Examination Report for PCT/JP02/03118 completed on Mar. 26, 2003.
International Search Report for PCT/JP02/03118 mailed on Jul. 2, 2002.

* cited by examiner

*Primary Examiner*—Peter A. Hruskoci
(74) *Attorney, Agent, or Firm*—Rader, Fishman & Grauer PLLC

(57) ABSTRACT

This invention relates to a method for treating acidic waste water, particularly mine effluent, and to a solid waste water treating material useful for the method. This waste water treating material is obtained by solidifying a mixture of rock wool and an inorganic binder mainly containing at least one kind selected from silicates, hydroxides and oxides of alkaline earth metals and alkali metals and has a porosity of 50% or more. When brought into contact with acidic waste water containing iron ions and sulfate ions, this waste treating material can not only neutralize the waste water but also remove harmful heavy metals such as iron and arsenic. Furthermore, it is easy to dispose the spent waste water treating material.

6 Claims, No Drawings

MATERIAL FOR TREATING ACIDIC WASTE WATER

FIELD OF TECHNOLOGY

This invention relates to solid waste water treating materials and a method for treating acidic waste water and, in particular, it relates to a method for neutralizing acids in mine effluent to remove heavy metals such as iron and arsenic.

BACKGROUND TECHNOLOGY

Waste water from acidic hot springs in volcanic regions, acidic mine effluent and acidic underground water in regions of volcanic soil contain sulfuric acid formed by the oxidation of sulfur-containing substances and iron sulfide ores. such acidic waste water exerts an adverse influence on concrete structures such as bridges and dams and, still more, acids and heavy metals such as iron and arsenic therein contained degrade water quality, exterminate fish and shellfishes and cause the so-called "red river" phenomenon when discharged indiscriminately. For this reason, it is necessary to submit acidic waste water to a neutralization treatment.

A method in wide use for this neutralization treatment consists of adding particles or a slurry of slaked lime to waste water. The chemical substance used in this method is relatively low in cost and has an excellent ability to neutralize acidic waste water; however, in the cases where waste water contains sulfate ions and iron ions in large quantities, the iron ions precipitate taking the form of colloidal ferric hydroxide as the pH rises and, besides, the sulfate ions react with slaked lime to form difficultly soluble gypsum and precipitate together with some of the unreacted slaked lime to form a slimy matter that is high in water content and difficult to dewater. While this is happening, heavy metals such as arsenic in waste water are adsorbed on the ferric hydroxide and precipitate together. As this slime is a highly hydrous slurry that is difficult to dewater and contains harmful substances, its disposal requires installation of a solid-liquid separator such as an expensive thickener, a sedimentation basin and a device for dewatering and compacting slime such as a labor-consuming filter press and construction of a dam for accumulating slime as a final disposal device. Thus, the disposal of slime poses problems of increased disposal cost and harmful influences on natural environment.

In order to reduce formation of slime that is highly hydrous and difficult to dewater, the use of magnesium oxide particles as a neutralizing material has been studied because magnesium oxide forms slime that is easier to dewater and does not form difficultly soluble reaction products such as gypsum, but a high cost of the chemical in question is a disadvantage.

Furthermore, in order to reduce cost and improve the dewatering performance of slime, the use of calcium carbonate particles and limestone grains has been tried. However, gypsum resulting from neutralization covers the surface of calcium carbonate or limestone to hinder a further progress of neutralization thereby reducing the efficiency in utilization of the neutralizing material. A neutralizing material based on calcium carbonate produces only a small effect for raising the pH and cannot precipitate ferrous ions in waste water as ferrous hydroxide. Therefore, a pretreatment becomes necessary to oxidize ferrous ions to ferric ions by aeration or by iron-oxidizing bacteria.

Application of inorganic fibers to a treatment of waste water as a filtering material or a material for binding microorganisms is disclosed in JP6-315681A and elsewhere but nothing is taught of the use of inorganic fibers as a material for neutralizing acidic waste water.

JP2000-73347A discloses drainage materials composed of inorganic fibers and inorganic hydraulic materials for underdrainage, but they are regarded as substitutes for the husks of rice used up to the present.

DISCLOSURE OF THE INVENTION

Accordingly, an object of this invention is to neutralize acidic waste water and remove harmful heavy metals such as iron and arsenic. Another object is to provide a solid waste water treating material which can prevent an occurrence of "red water" in rivers, is suited for service over a long period of time and exhibits a distinct ability to remove heavy metals. A further object is to provide a method for treating waste water which requires no costly equipment such as a neutralization device, thickener and press nor manpower and can be practiced practically without need of motive power and a source of electricity and without requiring maintenance. A still further object is to provide a method for treating acidic waste water which prevents useless sulfate ions from entering the spent treating material after execution of waste water treatment and facilitates waste disposal by reduction of volume and water content.

The solid waste water treating material of this invention is obtained by solidifying a mixture of rock wool and an inorganic binder mainly containing at least one kind selected from silicates, hydroxides and oxides of alkaline earth metals and alkali metals and exhibits a porosity of 50% or more.

Further, this invention relates to a method for treating waste water containing iron ions or sulfate ions or both and comprises bringing the aforementioned solid waste water treating material into contact with said waste water thereby removing 80% or more of the iron ions or neutralizing acidic waste water exhibiting a pH of 5 or less to a pH of 6 to 8.

The solid waste water treating material of this invention (hereinafter also referred to as waste water treating material) is obtained by solidifying mineral fibers with an inorganic binder.

Mineral fibers containing silicates of alkaline earth metals or alkali metals are used here. Mineral fibers preferably contain 30–50 wt % of $SiO_2$, 5–20 wt % of $Al_2O_3$, 30–50 wt % of MgO and CaO, 0–10 wt % of $Na_2O$ and $K_2O$ and 0–10 wt % of others. Rock wool and slag wool are examples of such mineral fibers and rock wool is preferred because of its distinct ability to neutralize acidic waste water.

This neutralizing ability is adequate when 10 g of the material is added to 1000 ml of an acidic solution containing 2500 mg/l of sulfate ions and 370 mg/l of $Fe^{+2}$ ions and exhibiting a pH of 1.8 and allowed to react with the stirred solution at room temperature for 24 hours thereby rendering the pH of the solution to 3 to 6, preferably 4 to 5, after the reaction. When the pH of the solution is lower than 3 after the reaction, the reactivity in neutralization is low and acids may remain in the treated water. On the other hand, when the pH of the solution is higher than 6 after the reaction, the reactivity in neutralization is too high and the components of rock wool constituting the waste water treating material leach into the water being treated and, as a result, the rock wool loses its property as fiber and deteriorates in water permeability and dewaterability.

Rock wool is produced by melting a variety of slags such as blast furnace slag and electric furnace slag, natural rocks such as basalt and diabase or a mixture thereof in an electric furnace or cupola and fiberizing the molten mass by a centripetal force or a pressurized gas. Rock wool contains CaO, $SiO_2$ and $Al_2O_3$ as main components and further contains MgO, $Fe_2O_3$ and others. A typical composition is 35–45 wt % of $SiO_2$, 10–20 wt % of $Al_2O_3$, 0.1–3 wt % of $Fe_2O_3$, 4–8 wt % of MgO, 30–40 wt % of CaO and 1–4 wt % of MnO. Rock wool can readily be processed into granular products, exhibits excellent water permeability and water retention, contains dead air spaces suitable for growth of microorganisms and has a function to neutralize acidic waste water on account of its basic chemical composition.

Rock wool to be used in this invention may be virgin rock wool, waste rock wool containing 50 wt % or more of rock wool or recovered rock wool.

Virgin rock wool is available in several shapes such as layered rock wool and granular rock wool and granular rock wool is preferred. Layered rock wool is processed into granular rock wool by a granulator or a rotary screen and a material with an average particle diameter in the range of 1–50 mm, preferably in the range of 5–40 mm, is suitable. Also, use may be made of granules obtained by cutting or crushing a molded rock wool article which is obtained by adding recovered rock wool and a binder followed by molding into a board or the like.

An inorganic binder useful for solidifying rock wool is mainly composed of at least one kind of silicates, hydroxides and oxides of alkaline earth metals and alkali metals, typically Ca, Mg, Na and K. Preferred inorganic binders are one or two kinds or more of cement, water glass, slaked lime, quicklime, magnesia, slag particles and fly ash and they are preferably hydraulic and possess a function to neutralize acids. A hydraulic inorganic binder is allowed to harden in the presence of water.

The acidic waste water neutralizing ability of a treating material is preferably such that 10 g of the material added to 1000 ml of an acidic solution containing 2500 mg/l of sulfate ions and 370 mg/l of $Fe^{+2}$ ions and exhibiting a pH of 1.8 is allowed to react with the stirred solution at room temperature for 24 hours thereby rendering the pH of the solution to 6 or more. When the pH of the solution after the reaction is short of 6, both inorganic binder and rock wool leach out simultaneously during the neutralization reaction and the waste water treating material loses the property as fiber and deteriorates in water permeability and dewaterability.

Hydraulic inorganic binders of the aforementioned kind include cement (typically portland cement), mixtures of latent hydraulic substances such as blast furnace slag particles and alkali materials and slaked lime which reacts with mineral fibers such as rock wool to cause solidification thereof. Other types of cement are available besides portland cement; for example, blast furnace slag cement, fly ash cement, magnesia cement, alumina cement and lime-mixed cement. Portland cement or blast furnace slag cement is preferable.

The mix ratio of rock wool and an inorganic binder varies with the kind of inorganic binder and an inorganic binder is normally used in a proportion of 10–60 wt %, preferably 20–50 wt %, of the sum total of rock wool and inorganic binder. Excessive use of an inorganic binder reduces porosity and deteriorates water permeability.

The method for mixing rock wool and an inorganic binder is not restricted and a known mixer such as ribbon blender can be used for this purpose. In case an inorganic binder is hydraulic, water is added in a required amount to cause solidification at the time of mixing or at the site of use after the mixture is transported there or after the mixture is applied there. It is further allowable to mix additionally a material reactive with acids such as limestone particles as occasion demands.

There is no restriction on the shape of the waste water treating material of this invention and one of preferred shapes is granular. To manufacture a waste water treating material which is molded and solidified in a granular shape, rock wool, an inorganic binder and water are mixed in a known mixer such as a ribbon blender and rotary granulator, molded into granules and solidified. The use of granular wool such as granular rock wool is advantageous in that the granulating operation can be omitted. In the case of granules, the average particle diameter is 1–200 mm, preferably 5–50 mm.

Another of preferred shapes is a sprayed structure. The spraying technique used for applying fireproof coating to buildings can be adopted here. This technique performs mixing of granular rock wool, cement and water and spraying at the same time and a mixture of cement and rock wool, a mixture of cement and water or a mixture of rockwool and water may be prepared in advance. In order to provide a layer of the waste water treating material of this invention by the spraying technique, granular rock wool as mineral fiber and cement as an inorganic binder are sprayed together with water and allowed to solidify to an average thickness of 5–300 mm, preferably 10–100 mm.

Another advantageous method comprises preparing a mixture of rock wool and a hydraulic inorganic binder in advance and solidifying the mixture by contact with water to give a solid waste water treating material.

A still another advantageous method comprises of filling a container with a mixture of rock wool and an inorganic binder and solidifying the mixture by contact with water to give a solid waste water treating material. This method becomes more advantageous if this container is a reactor for effecting the contact with water.

It is necessary for the waste water treating material of this invention to have a porosity of 50% or more regardless of its shape. The porosity is preferably in the range of 70–98%. Moreover, the bulk specific gravity of waste water treating materials is set in the range of 0.1–1.5, preferably in the range of 0.15–1.0.

The bulk specific gravity and porosity can be determined by known methods. The porosity is determined by weighing a cube of 1 $cm^3$ cut from a waste water treating material when it is dry (A g) and again when it is completely impregnated with water (B g) and computing the difference B−A.

Concretely, the porosity is determined in accordance with the method for determining the porosity in three phase distribution of soil (solid phase, liquid phase, and gas phase).

With the aid of a commercial soil sampler for a soil three phase meter (available from Daiki Rika Kogyo Co., Ltd.), a sample is gently cut out of the waste water treating material in the shape of a cylinder with a diameter of 50 mm and a height of 51 mm at the application site. In case the thickness of the layer of waste water treating material is short of 51 mm, a required number of layers are added one over another until the thickness reaches or exceeds 51 mm and a sample is cut out. The cutting operation is performed in compliance with the directions for handling the soil sampler.

The sample cut out of the waste water treating material in this manner is mounted on a commercial soil three phase meter (actual volume of soil (solid phase+liquid phase)) and an apparatus for measuring the gas phase according to the Boyle's law (available from Daiki Rika Kogyo Co., Ltd.) and the actual volume (solid phase+liquid phase) and the weight (wet) of the sample are determined in accordance with the procedure for operating the apparatuses.

To determine the proportion occupied by the liquid phase in the actual volume, the sample is dried sufficiently at 110 and weighed and the weight (dry) was subtracted from the weight (wet) to give a water content.

Since the internal volume of the sample is 100 ml, the porosity (%) can be calculated from the numerical values obtained above as follows;

Porosity (%)=100−(measured actual volume)+(water content)

The bulk specific gravity is calculated by dividing the weight (dry) by the internal volume of the sample or 100 ml.

When the porosity is too high or the bulk specific gravity is too low, the amount of waste water treating material per unit volume becomes insufficient and so becomes the neutralization treatment in some cases. When the porosity is too low or the bulk specific gravity is too high, a sufficient contact is not attained between acidic waste water and the treating material.

The waste water treating material of this invention is applicable to acidic waste water of any kind and is particularly effective for treating acidic waste water that contains iron ions or sulfate ions or both and exhibits a pH of 5 or less, preferably 1 to 4.

The aforementioned solid waste water treating material is useful as a waste water treating material in the method for treating acidic waste water of this invention and the method is particularly effective for treating waste water that contains iron ions, preferably $Fe^{+2}$ ions, and sulfate ions and exhibits a pH of 5 or less, preferably 1 to 4.

Although there is no restriction on the kind of waste water to be treated by the method of this invention, mine effluent is treated advantageously. Mine effluent is waste water discharged from a mine and contains both sulfate ions formed by the oxidation of sulfur and ferrous ions. Mine effluent oozes out of passageways to form a small stream, small streams unite to form a large stream which flows out of the passageways and mines or accumulates in a depression to be pumped out. Mine effluent is collected in storage tanks and ponds, treated and discharged into rivers.

The waste water treating material is also useful for acidic mine effluent oozing or flowing out of heaps of waste stones containing ores, outcrops of ores, abandoned mining sites such as open-pit mines and slag heaps of a smelting works.

Acidic waste water, particularly mine effluent, amenable to a treatment by the treating material of this invention is the one that shows an 8.3 acidity (the amount of alkali consumed to neutralize to pH 8.3) or a 4.8 acidity of 300 mg-$CaCO_3$/l or more and an iron ion concentration of 30 ppm or more and it is possible to reduce the 8.3 acidity to 200 mg-$CaCO_3$/l or less, the 4.8 acidity to 100 mg-$CaCO_3$/l or less and the iron ion concentration to 10 ppm or less by the treatment performed in accordance with this invention. That is, the pH rises less and the iron ion concentration decreases more compared with ordinary neutralizing materials.

Acids present in mine effluent and in underground water in regions covered by volcanic mud are mostly sulfuric acid while acids in hot springs in volcanic regions are mostly sulfuric acid and hydrochloric acid. The iron ion concentration in mine effluent is normally in the range of 50–500 ppm and mine effluent containing iron ions in an amount exceeding this range can be dealt with by applying a larger amount of the treating material.

In the cases where the waste water treating material of this invention is provided by spraying in a layered structure, it is preferable to build a sprayed structure at the sites where mine effluent oozes out or where oozed effluent forms a small stream. In such a case, the waste water treating material is applied by spraying at the site of treatment where waste water oozes out, for example, at the mouth of a mine, heaps of waste stones containing ores, outcrops of ores, abandoned mining sites such as open-pit mines and slag heaps of a smelting works or the treating material is applied to the whole area covering heaps and abandoned sites. At the aforementioned sites where mine effluent flows at a low rate, a layer of waste water treating material of even a moderate thickness can maintain a longer contact time. Rainwater that has passed through the waste water treating material of this invention shows a pH in the range of 8–12 because of leaching of alkali metals or alkaline earth metals contained in the treating material and this enhanced alkalinity is effective for reducing the activity of sulfur-oxidizing bacteria and iron-oxidizing bacteria and retarding the oxidation of sulfides contained in ores and slags thereby giving promise of reduced generation of acidic water.

At the site where mine effluent forms a large stream, the waste water treating material of this invention is advantageously applied by providing layers filled with granular waste water treating material at such sites and passing the mine effluent through the layers. In this case, it is preferable to control the thickness of filled layers or the flow rate in such a manner as to obtain a contact time of 30 minutes or more, preferably 1–5 hours, between the effluent and the waste water treating material. Moreover, the treated effluent is controlled at a pH of 6 to 8, preferably 6.5 to 7.5.

In the cases where the waste water treating material of this invention is used at the sites where mine effluent is first stored in a storage tank or a pond, a granular waste water treating material is added as it is to the mine effluent or it is packed in a basket-like container and submerged or suspended in the mine effluent. In the cases where the spent waste water treating material is recovered and replaced with a new material, the use of a container offers an advantage.

It is further possible to fill a treating tank with a waste water treating material and pass acidic waste water through the tank. In this case, an adequate procedure is to pass acidic waste water from the top through the tank filled with a granular waste water treating material, collect the effluent in a receiving trough provided beneath the tank and discharge as treated water. It is adequate here to control the thickness of the layers of waste treating material in the range of 100–2000 mm and the contact time in the range of 0.5–5 hours.

The use of a combination of two methods or more described above may be advantageous and these methods can be applied to acidic waste water other than mine effluent.

The temperature at which the treating material is kept in contact with waste water is satisfactorily room temperature and the contact time is 30 minutes or more, preferably 60 minutes or more, although it varies with the amount of filled material, throughput of waste water and concentration of the substances to be treated in waste water.

In a method for treating waste water containing iron ions or sulfate ions or both, a preferable procedure is to solidify a mixture of rock wool and an inorganic binder by contact with water to give a solid waste water treating material having a porosity of 50% or more and bring this solid waste water treating material into contact with waste water containing iron ions to remove 80% or more of iron. In this case, the concentration of iron ions in the waste water to be treated is preferably in the range of 100–250 ppm.

Moreover, with the use of the solid waste water treating material of this invention, iron ions precipitate when waste water having a pH of 3 or less is neutralized to a pH of 4 to 6 by contact with the treating material and removal of iron is preferably effected under this condition.

In another method of treating waste water containing iron ions or sulfate ions or both, it is advantageous to solidify a mixture of rock wool and an inorganic binder by contact with water to give a solid waste water treating material and bring this treating material into contact with acidic waste water having a pH of 5 or less thereby effecting neutralization to a pH of 6 to 8.

When the waste water treating material of this invention is brought into contact with acidic waste water, the alkaline earth metals and alkali metals in the treating material react with acids and silicic acid remains as amorphous silica. Sulfate ions partly react with calcium in the waste water treating material to produce gypsum, but the amount of gypsum thus produced is small because of the presence of other alkaline earth metals and alkali metals. In consequence, sulfate ions mostly form harmless water-soluble sulfates and are discharged. Iron ions in mine effluent are mostly ferrous ions and, when brought into contact with the waste water treating material of this invention, their reaction with the material progresses slowly and in the meantime ferrous ions are oxidized by dissolved oxygen and the like to ferric ions and precipitate as ferric hydroxide. Mine effluent sometimes contains heavy metals such as arsenic and cadmium and most of these metals can be precipitated and removed by contact with the waste water treating material of this invention.

When the waste water treating material of this invention is used, alkaline earth metals and alkali metals decrease and ferric ions formed in a large amount in the reaction precipitate as ferric hydroxide and it is desirable to replace or add the treating material immediately before the pH of the treated water or an indicator of the ability as an acidic waste water treating material drops below the value specified for the treating site or immediately before the iron ion concentration in the treated water reaches 10 mg/l.

Replacement or addition of the treating material is preferably performed as follows. When the treating material stops giving the specified performance in waste water treatment, the treating material is renewed as follows; rock wool and an inorganic binder are sprayed again with or without removal of the spent material, a mixture of rock wool and an inorganic binder is added or the spent mixture is replaced with a newly prepared mixture or the container is refilled with a freshly prepared mixture. In this case, it is preferable to follow the renewal procedure while adding water to solidify the waste water treating material and the addition of water may be made either after or simultaneously with mixing of rock wool and the inorganic binder. In case the container is to be filled with the mixture, it is advantageous to add water to solidify the mixture of rock wool and inorganic binder immediately after filling.

The spent waste water treating material contains the unreacted silicates, reaction residues mainly containing silica, and reaction products comprising a large mount of iron compounds and a small amount of gypsum. Therefore, the spent waste water treating material can be used as an iron-containing soil conditioner and the like and is easily disposed unless the material in question contains harmful components such as arsenic. It is preferable for the solid waste water treating material of this invention to contain 50 wt % or more of amorphous silica in the residual treating material after use in waste water treatment.

The rock wool-containing waste water treating material of this invention can prevent the treated water from becoming excessively alkaline and does not require readjustment of the pH by acid. Moreover, silicate gels formed from rock wool coprecipitate with iron colloids to directly replace rock wool and form a solid fibrous aggregate and, as a result, slime which is hard to dewater does not form and at the same time precipitation of iron contained in waste water is accelerated. Furthermore, since rock wool contains other readily leachable cations, the neutralization reaction is hindered very little by gypsum. Still further, the dewatering performance does not deteriorate very much if the treating material is rendered granular for higher water permeability. When the products in the spent treating material contain little harmful heavy metals, the spent material can be utilized as a soil conditioner and the like.

PREFERRED EMBODIMENTS OF THE INVENTION

EXAMPLE 1

Granular rock wool (granular S-FIBER, average particle diameter 30 mm, available from Nippon Steel Chemical Rockwool Co., Ltd.) was used as rock wool.

To begin with, the test for leaching of rock wool was performed. Rock wool was pulverized finely in a mortar, 1 g of the pulverized rock wool was immersed in 150 ml each of pure water, 2% aqueous citric acid, 0.25 N hydrochloric acid and 0.5N hydrochloric acid and the amounts of leached alkaline earth metals, alkali metals, silica and alumina were determined (expressed in ppm of the components leached from 1 g of rock wool). The results are shown in Table 1. The analysis was carried out in accordance with the method for analysis of fertilizers.

It is seen from Table 1 that rock wool reacts not only with hydrochloric acid but also with a weak acid such as citric acid.

After this, a granular acidic waste water treating material (average particle diameter 20 mm, porosity 95%) obtained by solidifying 100 g of a mixture of 60 wt % of rock wool and 40 wt % of blast furnace slag cement with 100 g of water was pulverized finely in a mortar, the pulverized treating material was added to 1000 ml of acidic effluent that was sampled at a mine of iron sulfide ores, contained 1300 mg/l of sulfate ions and 135 mg/l of total iron ions and exhibited a pH of 2.8, batch tests were carried out to determine the changes in pH with time and the results are shown in Table 2. Removal of total iron ions determined 1 hour after the addition was 99.9%. All the tests were carried out at room temperature with stirring.

These results indicate that rock wool by itself cannot remove iron ions, but rock wool converted into a waste water treating material in accordance with this invention can remove iron ions as the iron ions penetrate into the material and participate in the reaction.

EXAMPLE 2

A pulverized molded rock wool article (rock wool for plant cultivation, available from Grodan Co., average particle diameter 50 mm, porosity 92%) was used as rock wool and it was finely pulverized in a mortar and tested for leaching as in Example 1 to give the results shown in Table 1.

After this, the aforementioned rock wool was substituted for the rock wool in Example 1 and a mixture of the aforementioned rock wool and blast furnace slag cement was solidified to form a waste water treating material (average particle diameter 50 mm, porosity 95%), pulverized finely in a mortar as in Example 1 and tested for the changes in pH to give the results shown in Table 2. Removal of total iron ions was 99.2% when determined 1 hour after the addition.

passed from the top of the container at a rate of 14.5 L/hr. Addition of the neutralizing material per 1 $m^3$ of the mine effluent was 0.4 $kg/m^3$ during this treatment.

The treated water flowing out of the bottom of the container showed iron removal of 99.9% and arsenic removal of 94.2%. The iron content in the spent waste water treating material was 53% and 14% of the neutralizing material remained. The water quality of the treated water is shown in Table 3.

The water permeability of the waste water treating material was $1.0 \times 10^{-2}$ cm/s initially and $0.6 \times 10^{-2}$ cm/s after passage of 50 t of mine effluent. The volume of the waste

TABLE 1

|           |                 | Na    | K     | Ca     | Mg    | Si     | Al    |
|-----------|-----------------|-------|-------|--------|-------|--------|-------|
| Example 1 | Pure water      | 11    | 15    | 230    | 17    | 27     | 4     |
|           | 0.2% Citric acid| 720   | 2000  | 190000 | 24000 | 69000  | 31000 |
|           | 0.25 N HCl      | 730   | 1900  | 170000 | 24000 | 43000  | 30000 |
|           | 0.5 N HCl       | 730   | 2000  | 200000 | 24000 | 59000  | 31000 |
| Example 2 | Pure water      | 16    | 3     | 22     | 17    | 16     | 10    |
|           | 0.2% Citric acid| 17000 | 26000 | 76000  | 35000 | 120000 | 54000 |
|           | 0.25 N HCl      | 17000 | 25000 | 75000  | 33000 | 110000 | 54000 |
|           | 0.5 N HCl       | 21000 | 29000 | 90000  | 39000 | 120000 | 64000 |

EXAMPLE 3

The same rock wool as used in Example 1 was mixed with portland cement in a ribbon blender in a weight ratio of 60 of the former to 40 of the latter, the mixture was sprayed with water weighing the same as the mixture, and left standing overnight to give a granular solid (a waste water treating material) exhibiting an average particle diameter of 20 mm and a bulk specific gravity of 0.196.

This waste water treating material (100 g) was added to 1000 ml of the same waste water as used in Example 1 and batch tests were carried out to determine the changes in pH to give the results shown in Table 2. Removal of total iron ions determined one hour after the addition was 98.0%.

TABLE 2

| Time elapsed | Example 1 | Example 2 | Example 3 |
|---|---|---|---|
| 4  | 6.2 | 6.1 | 6.4 |
| 8  | 6.3 | 6.2 | 6.9 |
| 16 | 6.5 | 6.6 | 6.9 |
| 24 | 6.6 | 6.9 | 6.9 |
| 72 | 6.9 | 7.2 | 7.1 |

EXAMPLE 4

The same rock wool as used in Example 1 was mixed with portland cement in a ribbon blender in a weight ratio of 64 of the former to 36 of the latter to give an unsolidified waste water treating material exhibiting an average particle diameter of 20 mm and a bulk specific gravity of 0.17.

Then, a container measuring 90 cm in height, 120 cm in length and 16 cm in width provided with a plastic net at the bottom was filled with 20 kg of the unsolidified waste water treating material to give a 60 cm-thick mass with a porosity of 92% and a bulk specific gravity of 0.20 and this mass was solidified by adding water of the same weight as the mass to give a solid waste water treating material.

Upon completion of solidification, 50 $m^3$ of acidic mine effluent having the water quality shown in Table 3 was water treating material was 88% of the initial volume after passage of 50 t of the mine effluent. The water content in the waste water treating material after passage of 50 t of the mine effluent was 77.2% on the average when determined 30 minutes after passage of the mine effluent was stopped and the bulk specific gravity after drying at 110° C. was 184 $kg/m^3$.

TABLE 3

| Water quality | pH | T—Fe mg/l | As mg/l | $SO_4^{2-}$ mg/l | 8.3 acidity mg-$CaCO_3$/l | 4.8 acidity mg-$CaCO_3$/l |
|---|---|---|---|---|---|---|
| Acidic mine effluent | 2.8 | 90.3 | 0.12 | 956 | 830 | 768 |
| Treated water | 4.1 | 0.05 | 0.007 | 960 | 64 | 1 |

COMPARATIVE EXAMPLE 1

Reagent-grade calcium hydroxide in 325-mesh particles was added to the same acidic mine effluent as used in Example 4 and the amount of calcium hydroxide required to neutralize the mine effluent to the same 8.3 acidity as in the case of the treated water in Example 4 was determined. It was 0.58 $kg/m^3$ per 1 $m^3$ of the mine effluent. To 1000 ml of this mine effluent was added 580 mg of slaked lime as a neutralizing material, the mixture was stirred at room temperature for 24 hours and the entire lot was filtered through a vacuum filter (a suction funnel, inside diameter 70 mm, No. 5C filter paper). The time required for filtration was 342 seconds. The water permeability of the filtered material was $4 \times 10^{-6}$ cm/s.

COMPARATIVE EXAMPLE 2

The amount of sodium hydroxide to neutralize the same acidic mine effluent as used in Example 4 to the same 8.3 acidity as in the treated water obtained in Example 4 was determined by adding an aqueous sodium hydroxide solution (1 mol/l) to the acidic mine effluent according to the method for analysis of water quality specified by JIS and this amount was used to calculate the amount of calcium carbonate required to neutralize the acidic mine effluent to 8.3 acidity. It was 0.77 kg/m$^3$ per 1 m$^3$ of the mine effluent. To 1000 ml of this mine effluent was added reagent-grade calcium carbonate in 325-mesh particles, the mixture was stirred at room temperature for 24 hours and checked for its pH, which was 6.9. The entire lot was then filtered through a vacuum filter (a suction funnel, inside diameter 70 mm, No. 5C filter paper). The time required for filtration was 93 seconds. The water permeability of the filtered material was 1×10$^{-5}$ cm/s.

COMPARATIVE EXAMPLE 3

The same acidic mine effluent as used in Example 4 was introduced at a rate of 0.05 m$^3$/min to an oxidation tank with an internal volume of 1 m$^3$, the same reagent-grade calcium carbonate in particles as used in Comparative Example 2 was added at a rate of 0.20 kg/m$^3$ per 1 m$^3$ of the mine effluent to keep the pH inside the oxidation tank at 3 to 4 and iron-oxidizing bacteria and air were blown into this reaction system thereby oxidizing ferrous ions to ferric ions. The reaction mixture was then introduced to a neutralization tank with an internal volume of 1 m$^3$, the same reagent-grade calcium carbonate in particles as used in Comparative Example 2 was added at a rate of 0.57 kg/m$^3$ per 1 m$^3$ of the mine effluent, the resulting mixture was stirred to precipitate ferric ions as ferric hydroxide, and the effluent containing this reaction product was settled in a thickener with a diameter of 2 m and an internal volume of 5 m$^3$ to effect separation into the treated water and the reaction product. The reaction product was returned to the neutralization tank at a rate of 0.02 m$^3$/min to raise the utilization efficiency of the neutralizing material and the dewaterability of the reaction product. The slurry obtained from the thickener showed a water content of 99% at this time and the slurry dewatered under a pressure of 11 kg/cm$^2$ by a filter press with a filtering area of 0.25 m$^2$ showed a water content of 76%.

Removal of iron from the original mine effluent was 99.9% and that of arsenic was 99.8%, the iron content in the reaction product after use was 38% and the rate of survival of calcium carbonate was 45%. The concentration of sulfate ions at that time was reduced to 74% of that of the original mine effluent. However, compared with Example 4, a larger amount of the neutralizing material was used per 1 m$^3$, the iron content in the reaction product was lower and the rate of survival of unreacted calcium carbonate was higher than those in the examples, and more unreacted calcium carbonate remained; this means that the treating material was utilized less efficiently and the reaction products took in sulfate ions that needed not to be removed thereby gaining weight and increasing the work load at the final disposal site. Moreover, the operation requires extra steps of oxidation by air blowing and dewatering under pressure of the reaction product by a filter press and this was a shortcoming in respect to labor saving and capital cost.

Industrial Applicability

The method for treating acidic waste water by the use of acidic waste water treating material of this invention effects not only neutralization but also removal of harmful heavy metals such as iron and arsenic. The waste water treating material of this invention reacts with acidic waste water thereby causing more to form soluble compounds and less to remain behind, the water permeability is maintained after use and volume reduction becomes possible and a dewatering apparatus such as a filter press becomes unnecessary.

What is claimed is:

1. A method for treating acidic waste water containing iron ions, or iron ions and sulfate ions, which method comprises
    solidifying a mixture of (i) granular rock wool and (ii) an inorganic binder comprising at least one selected from the group consisting of silicates, hydroxides, and oxides of alkaline earth metals and alkali metals to form a solid waste water treating material having a porosity of 70–98% and a bulk specific gravity of 0.1–1.0, and
    bringing said solid waste water treating material into contact with acidic waste water containing iron ions, or iron ions and sulfate ions, to thereby remove 80% or more of the iron ions.

2. A method for treating acidic waste water as described in claim 1, wherein the concentration of iron ions is 100–250 ppm.

3. A method for treating acidic waste water as described in claim 2, wherein the removal of iron is effected under such neutralizing conditions as to change the pH of said acidic waste water from 3 or less before treatment to 4 to 6 after treatment.

4. A method for treating acidic waste water containing sulfate ions, or sulfate ions and iron ions, which method comprises
    solidifying a mixture of (i) granular rock wool and (ii) an inorganic binder comprising at least one selected from the group consisting of silicates, hydroxides, and oxides of alkaline earth metals and alkali metals to form a solid waste water treating material having a porosity of 70–98% and a bulk specific gravity of 0.1–1.01, and
    bringing said solid waste water treating material into contact with acidic waste water having a pH of 5 or less to thereby effect neutralization of said acidic waste water to a pH of 6 to 8.

5. A method of providing a waste water treating material for treating acidic waste water containing iron, which method comprises spraying, mixing or filling in a container (i) granular rock wool and (ii) an inorganic binder comprising at least one selected from the group consisting of silicates, hydroxides and oxides of alkaline earth metals and alkali metals, wherein said waste water treating material has a porosity of 70–98% and a bulk specific gravity of 0.1–1.0. and contacting said waste water with said waste water treating material.

6. A method for treating acidic waste water containing iron, which method comprises spraying, mixing or filling in a container (i) granular rock wool and (ii) an inorganic binder comprising at least one selected from the group consisting of silicates, hydroxides and oxides of alkaline earth metals and alkali metals, to provide a waste water treating material having a porosity of 70–98% and a bulk specific gravity of 0.1–1.0,
    bringing said waste water treating material into contact with acidic waste water containing iron, and
    upon a decrease in performance of said waste water treating material, reapplying said granular rock wool and said inorganic binder with or without removing the used waste water treating material.

* * * * *